United States Patent
Hunt

(10) Patent No.: US 8,417,476 B2
(45) Date of Patent: Apr. 9, 2013

(54) DYNAMIC RANDOMIZED CONTROLLED TESTING WITH CONSUMER ELECTRONICS DEVICES

(75) Inventor: Neil Hunt, Los Altos, CA (US)

(73) Assignee: Netflix, Inc., Los Gatos, CA (US)

( * ) Notice: Subject to any disclaimer, the term of this patent is extended or adjusted under 35 U.S.C. 154(b) by 502 days.

(21) Appl. No.: 12/689,171

(22) Filed: Jan. 18, 2010

(65) Prior Publication Data

US 2011/0178769 A1 Jul. 21, 2011

(51) Int. Cl.
G06F 19/00 (2011.01)
(52) U.S. Cl. ............................. 702/108; 702/182
(58) Field of Classification Search .............. 702/57, 702/108; 705/7.11, 36 R
See application file for complete search history.

(56) References Cited

U.S. PATENT DOCUMENTS 6,826,541 B1 * 11/2004 Johnston et al. ............ 705/36 R
7,283,811 B2 10/2007 Gidron et al.

OTHER PUBLICATIONS

International Search Report for PCT/US11/21563 dated Mar. 29, 2011, 14 pages.

* cited by examiner

Primary Examiner — Manuel L Barbee
(74) Attorney, Agent, or Firm — Patterson & Sheridan LLP

(57) ABSTRACT

One embodiment of the present invention sets forth a technique for performing dynamic randomized controlled testing to evaluate design choices for a consumer electronics (CE) device. A plurality of CE devices may communicate with a server system over a data communications network to be assigned a variant of the design choice. The variant may correspond to a variant of a user interface component of the CE device or a functional component of the CE device. Once assigned, feedback may be collected from the plurality of CE devices specifying one or more performance metrics associated with the design variant assigned to a respective CE device.

24 Claims, 5 Drawing Sheets

DYNAMIC RANDOMIZED CONTROLLED TESTING WITH CONSUMER ELECTRONICS DEVICES

BACKGROUND OF THE INVENTION

1. Field of the Invention

Embodiments of the invention generally relate to consumer electronics devices. More specifically, embodiments of the invention relate to techniques for performing dynamic randomized controlled testing for design choices in consumer electronics devices.

2. Description of the Related Art

Randomized controlled testing (RCT) refers to an experimental methodology frequently used to test the efficacy or effectiveness of something, e.g., a pharmaceutical compound. In a randomized controlled trial, one or more test groups of users are compared to one or more control groups of users. Typically, qualified participants are randomly allocated into groups, where participants in some groups receive the item or items of interest while participants in other groups do not. Importantly, the participants are generally unaware of which group they are assigned to. So long as the number of participants is sufficient, RCT provides an effective method for balancing out random or noise factors between groups, allowing the aspect of the item of interest to be evaluated quantitatively against the control group.

Design choices for consumer electronics (CE) devices, however, have generally not been the subject of randomized controlled testing as CE devices are generally manufactured and distributed using a single, fixed form. This has occurred as building and distributing multiple versions of a given CE device is hard to manage. For example, distributing multiple versions randomly (i.e. without a preponderance of one version in a particular channel) has proven very difficult. Further, a manufacturer or distributor of a particular CE device may be reluctant to distribute different versions of a single product, particularly where versions of an untested one may in practice prove to be highly disfavored by consumers.

Additionally, even were a manufacturer to distribute multiple CE devices, collecting feedback on usage and results is extremely limited, since there is not a reliable means for consumers' behavior to be observed, monitored, or tested. While a survey may result in some consumer feedback, this approach has both response and bias issues. Further still, a manufacturer may be unable to discern which version of a given CE device a consumer is responding about.

SUMMARY OF THE INVENTION

One embodiment of the present invention includes a method for evaluating design choices for a consumer electronics (CE) device. The method may generally include receiving, from each of a plurality of CE devices deployed with users, a communication over a data communication network. In response to the received communication from each respective CE device, one of a first design variant of the design choice and a second design variant of the design choice may be assigned to the CE device, and an indication of the assigned design variant of the design choice may be transmitted to the CE device. The method may further include collecting feedback from the plurality of CE devices specifying one or more performance metrics associated with the design variant assigned to a respective CE device.

One advantage of an embodiment of the disclosed method is that an RCT test may be designed to evaluate different variations of a user interface presented to users of the CE device or to evaluate algorithms executed on the device (or the server) without requiring multiple variations to be manufactured and distributed with the CE device.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
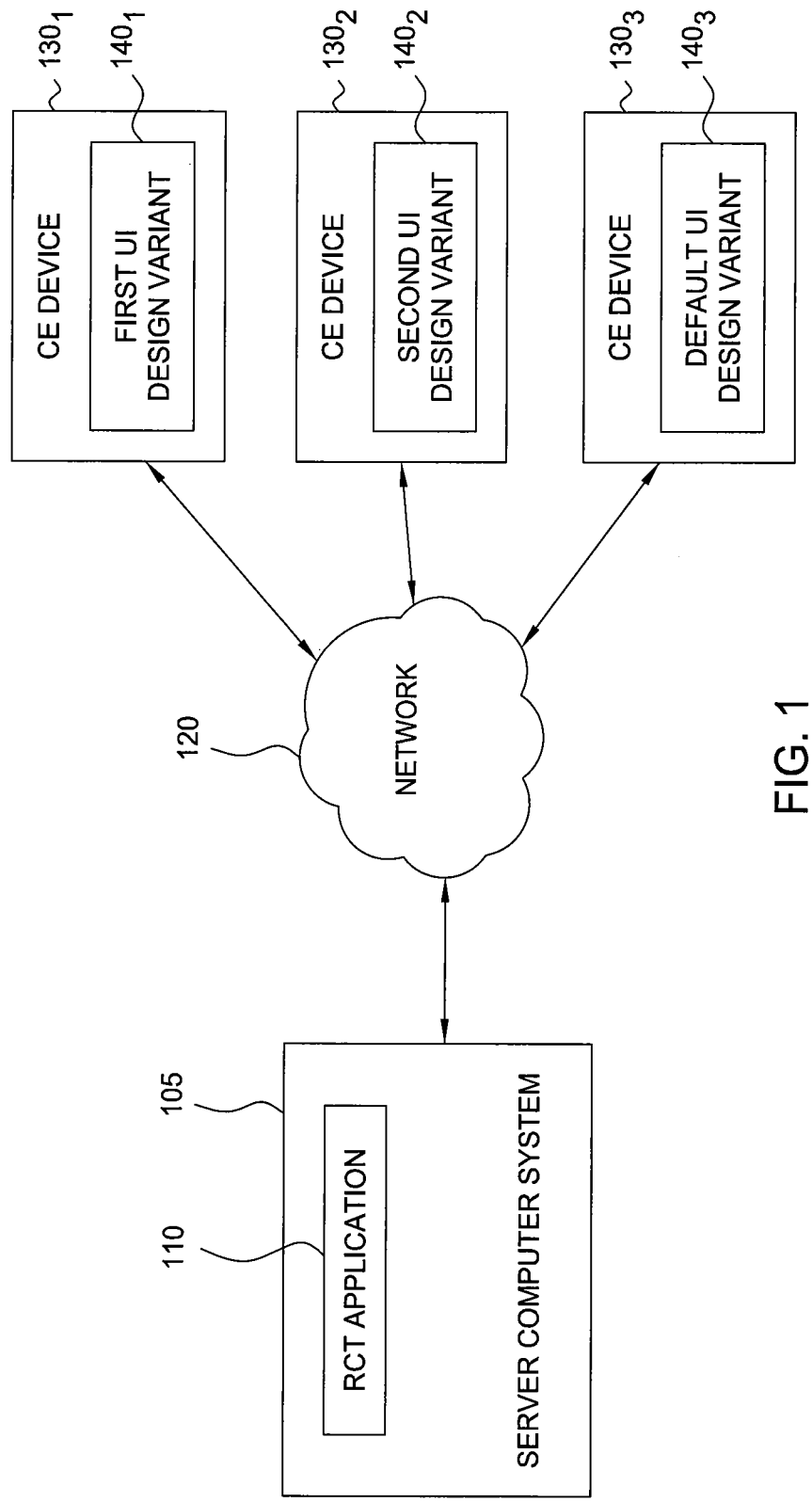
FIG. 1 illustrates a computing infrastructure configured to provide dynamic randomized controlled testing with consumer electronics devices, according to one embodiment of the invention.

Embodiments of the invention provide techniques for using randomized controlled testing (RCT) to evaluate a variety of different design choices for a consumer electronic device (e.g., a DVD player, television, set-top box, mobile phone, game platform, or portable music player, etc.). In one embodiment, a CE device may be configured to connect to a server computer system managing a given RCT test or trial. The server may (e.g., randomly) assign the CE device to a test pool, where CE devices assigned to the same pool receive the same variant of the design choice. That is, network aware CE devices may connect to the server to obtain test-control parameters distributed in a randomized manner. For example, test-control parameters could specify how the CE device should configure a user interface or to enable (or disable) certain functions or features provided the CE device.

In one embodiment, the RCT test may be designed to evaluate different variations of a user interface (e.g., the structure or content of a control menu) presented to users of the CE device. The RCT test may also be designed to evaluate algorithms executed on the device (or the server), e.g., to test variations of an algorithm used for shuffling music selections on a portable music player or to test variations of an algorithm used for recommending movies to a user. Once assigned to a pool, the server (or the CE device) may be configured to ensure that the CE device consistently receives the variant of the design choice assigned to that CE device. For example, a set-top box configured to stream media content to a television may contact a server and consistently download a particular variant of user interface elements being evaluated by an RCT test based on a user account or a serial number associated with the CE device. Alternatively, the CE device itself may be configured to store an indication of what test pool the device is assigned to and request the design choice variant assigned to that pool.

As users interact with the CE device, feedback may be provided to the server by the CE device itself. However, users of the CE device may also be asked to participate in feedback surveys used to collect qualitative and/or quantitative data regarding their variant of the design choice.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Further, particular embodiments of the invention are described using an example of a consumer electronics device used to stream movies, music, television programming, etc., over a data communications network. However, it should be understood that the invention may be adapted to provide RCT testing for a broad variety of network aware/capable consumer electronics devices such as disc players (which may include, e.g., a CD, DVD, or Blu-ray® disc loader tray and logic for reading the optical disc), web-based interfaces, set-top boxes, mobile telephones, game platforms, portable music players, home media systems, etc. Accordingly, references to a streaming media device are merely illustrative and not limiting.

FIG. 1 illustrates a computing infrastructure configured to provide dynamic randomized controlled testing for consumer electronics devices, according to one embodiment of the invention. As shown, the computing infrastructure includes a server computer system 105 and a plurality of consumer electronics (CE) devices $130_{1-3}$, each connected to a communications network 120.

Illustratively, each of the CE devices $130_{1-3}$ communicates with the server system 105 over the network 120 to download components of a user interface. For example, the CE devices $130_{1-3}$ may include a player component capable of executing an Adobe Flash® file, Microsoft® Silverlight® package, a BrightScript application, or an HTML5 object. Of course, other approaches may be used to allow the CE device 130 to receive a user interface (or algorithms) dynamically from the server computer system 105. In this example, CE devices $130_{1-2}$ include a first user interface design variant $140_1$ and a second user interface design variant $140_2$, respectively, while CE device $130_3$ is shown with a default user interface design $140_3$. That is, the CE device $130_3$ includes a control user interface against which the first user interface design variant $140_1$ and the second user interface design variant $140_2$ are evaluated as part of a randomized control trial.

As an alternative, the CE devices $130_{1-3}$ might be programmed with firmware to render all three user interfaces, and will pick which interface they actually render based upon a simple parameter or flag delivered across the network specifying which user interface to render for this particular instance.

The server computer system 105 includes a randomized controlled testing (RCT) application 110. As described in greater detail below, the RCT application 110 may be configured to manage the distribution of the user interface variants $140_{1-3}$ to the CE devices $130_{1-3}$, as well as receive feedback from the CE devices $130_{1-3}$ indicating how users interact with the design choice variant 140 distributed to a particular CE device 130. For example, the RCT application 110 may receive feedback indicating whether a user accessed a particular menu or other user interface control or how long it took for a user to accomplish a particular task (e.g., to search, select, and begin viewing a movie streamed from server computer system 105 to one of CE devices 130). Or, in the context of an RCT test used to evaluate differing algorithms, the RCT application 110 may be configured to monitor how much of a movie recommended by variants of a suggestion algorithm are actually watched by a user, presumably as a measure of how well the algorithm can suggest movies that a given user ends up actually enjoying. Of course, the particular interface choices, configuration parameters delivered to the CE device, and user interactions or events reported by the CE device back to the RCT application 110 may be tailored for any particular randomized control test.

Figure 2:
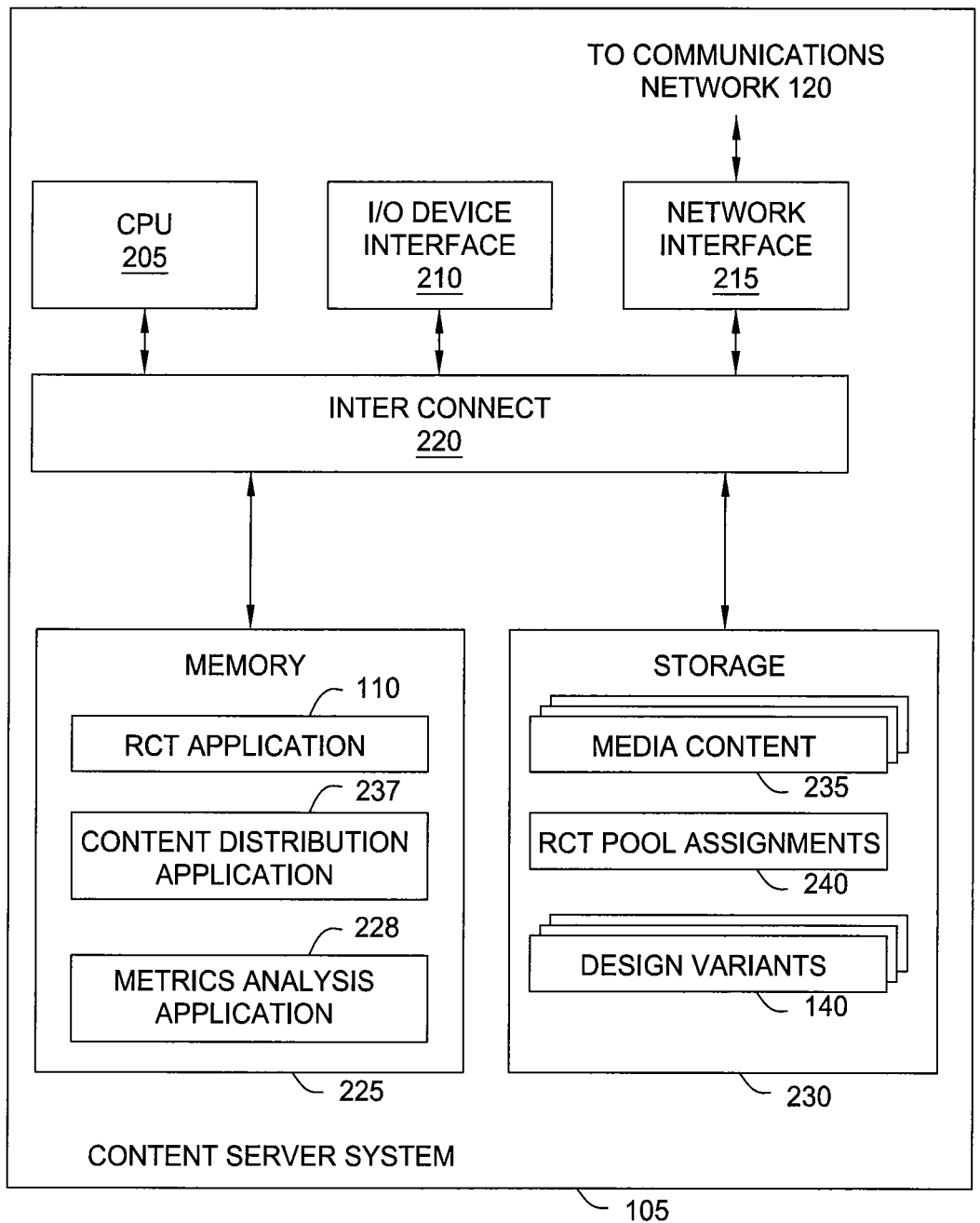
FIG. 2 is a more detailed view of the server computing system of FIG. 1, according to one embodiment of the invention.

FIG. 2 is a more detailed view of the server computing system 105 of FIG. 1, according to one embodiment of the invention. As shown, the server computing system 105 includes, without limitation, a central processing unit (CPU) 205, a network interface 215, an interconnect 220, a memory 225, and storage 230. The content server 105 may also include an I/O devices interface 210 (e.g., keyboard, display and mouse devices).

The CPU 205 retrieves and executes programming instructions stored in the memory 225. Similarly, the CPU 205 stores and retrieves application data residing in the memory 225. The interconnect 220 facilitates transmission, such as of programming instructions and application data, between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. The storage 230 may be a disk drive storage device. Although shown as a single unit, the storage 230 may be a combination of fixed and/or removable storage devices, such as fixed disc drives, floppy disc drives, tape drives, removable memory cards, or optical storage, network attached storage (NAS), or a storage area-network (SAN).

Illustratively, the memory 225 includes the RCT application 110 of FIG. 1, a content distribution application 227, and a metrics analysis application 228. Storage 230 includes a collection of media content 235, test pool assignments 240 and design variants 140. The content distribution application 227 may generally be configured to respond to requests to stream media content 235 to a CE device over network 120.

As noted above, the RCT application 110 may be configured to assign some CE devices to receive a particular design variant 140 as part of an RCT trial and assign another design variant 140 to others. Such assignments may be stored in test pool assignments 240. For example, the CE device may store an electronic serial number (ESN) or similar preset identifying token that is communicated to the RCT application 110 and used to index into a database or other record of which cell or design variation of the user-experience is tied to that specific CE device. Similarly, the ESN may be used to collect and aggregate the performance metrics in order to analyze the test results. Alternatively (or additionally), the CE device may have persistent storage used to store a token or parameter furnished by the server on initial assignment of a design variant 140. In such a case, the parameter may be communicated back to the RCT application 110 each time a server-controlled experience variation is required, or a result is passed to the metrics analysis application 228 for analysis.

While a broad variety of design choices for a CE device may be evaluated, examples of RCT testing that may be performed for a streaming media device include evaluating variants of user interface elements such as a layout of major components of a user interface (e.g., the placement of information using rows or columns of choices), the colors or sizes of fonts, or the text on buttons, menus, and descriptions or instructions. Further, the RCT test may focus on user interaction, such as exposing or hiding specified options, variations, or choices, e.g., exposing or hiding parental control options. Similarly, an RCT test may evaluate the implementations of different kinds of media control, e.g., (speeds of fast-forward and rewind) or variations on the flow or order of setup, management, or use functions performed to engage in a particular task or access a given feature provided by the CE device through the user interface.

In one embodiment, the RCT application 110 may provide a server-delivered user interface to a CE device. That is, design variants 140 may provide variations of a complete user-interface delivered as a module to the CE device. For example, as noted above, scripted user interfaces can be produced in scripting languages such as Adobe® Flash®, BrightScript, or HTML, etc. In one embodiment, the CE device may be configured to store only the user interface assigned to the CE device. In such a case, the RCT application 110 may randomly assign one of the design variants 40 to different instances of the CE device, which then retrieves and stores the server-delivered user interface.

Alternatively, the RCT application 110 may provide server-delivered user-interface parameters to the CE device. For example, multiple different variations of a user interface or user-experience may be built-in to the CE device at time of manufacture (or upon a conventional firmware update cycle in which the software on the device is changed in whole or in part from a disc, USB device, or via the Internet). In such a case, design variant 140 may represent a parameter delivered to the CE device, instructing it to use one particular variation. For example, a CE device might contain two different user interfaces, one with large fonts and one with small fonts. In such a case, the RCT application 110 may instruct some CE devices to use to use UI number 1 with large fonts and some of the devices to use UI number 2 with small fonts. If the hours of usage, or engagement, or other measurements of interest vary between the large and small fonts, this can be determined and applied to future versions of the CE device as a platform for iterative improvement.

Similarly, the server-delivered user-interface parameters may provide a flag or set of flags turning on or off functionality such as additional features, or different interaction modes available for the device. Further, the design variants 140 may include different server-delivered versions of algorithms or supplemental code. For example, a CE device may support scripting languages such as Java®, JavaScript, C# (c-sharp), etc., that allow new algorithms or logic to be downloaded to the CE device on a test-specific basis. For example, the design variants 140 might be used to conduct RCT testing using different versions of how the CE device downloads and streams media, trading off startup time versus quality, versus probability of an interruption in streaming, versus amount of memory consumed in buffering the content, etc.

The server delivered parameters may be used to differentiate the user experience and/or functionality of a CE device. For example, a CE device may have built-in logic or algorithms to "learn" the viewing preferences of a given user. In such a case, a media player might have algorithms to suggest specific media selections to the user based upon what they have viewed in the past, which member(s) of the family are present, what time of day it is, etc. Note however, the functionality or logic of an algorithm being evaluated need not reside on the CE device. That is, a CE device may be able to leverage servers elsewhere on a network (e.g., the Internet) to compute or deliver differentiated experiences to the consumer. For example, a CE device configured to stream media might rely upon a server to manage and organize choices, recommendations, ratings, and reviews of specific media items for presentation to the user. Further, CE devices can use the Internet to provide a shared or collaborative experience with other users, either concurrently or separated in time. Such collaborative experiences can include multi-player gaming, simultaneous or synchronized movie viewing, or simply sharing reviews, ratings, and comments about recently watched movies with friends who might watch the same or different media in the future.

The metrics analysis application 228 may be configured to receive the results being measured by a particular randomized controlled test. In one embodiment, the metrics analysis application 228 may be configured to measure user interaction directly. For example, the metrics analysis application 228 may be configured to receive parameters from the CE device such as usage count for a particular feature, hours of total usage, counts of events of interest (e.g., an event might be streaming at least 15 minutes of any media item selected on the basis of a suggestion by a design variant of a suggestion algorithm).

In one embodiment, measurements may be logged on the CE device in non-volatile storage, and then queried periodically when the CE device connects to the server 105, or autonomously sent back the server 105, e.g. by email. The latter approach may be useful when connectivity is intermittent, and metrics can be stored on the CE device until connectivity is next established. Alternatively, events and triggers of interest can be transmitted back to the metrics analysis application 228 on the server 105 as they occur. In some cases, a combination of both may be appropriate. For example, the CE device may log hours of usage and update the server as each additional hour of usage occurs.

Figure 3:
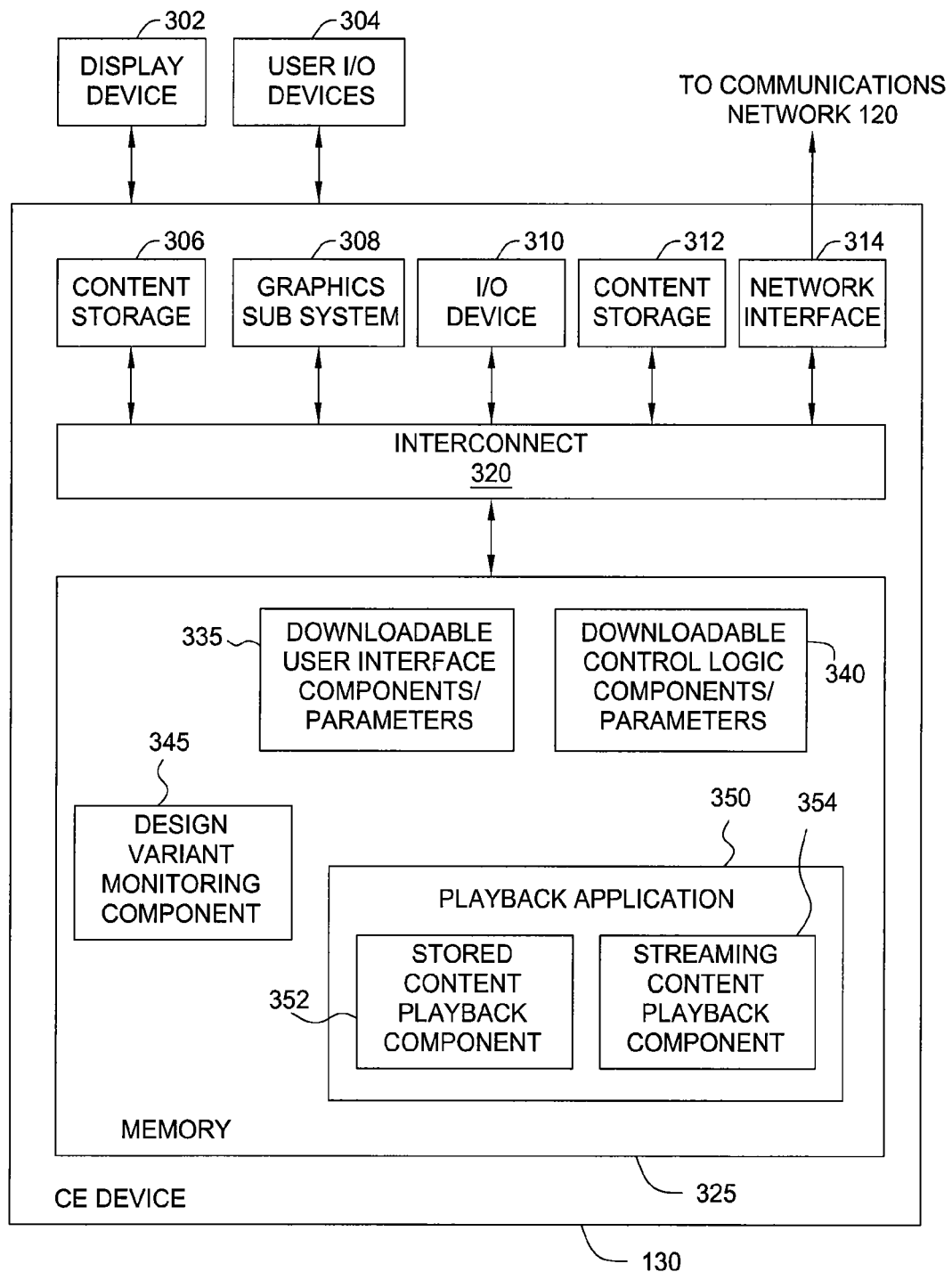
FIG. 3 is a more detailed view of the consumer electronics device of FIG. 1, according to one embodiment of the invention.

In addition to direct measurement, the metrics analysis application 228 may be configured receive other information for elevating different design variants 140. For example, if the CE device is associated with a specific user's name or contact details (e.g., a phone number or email), then users may be surveyed by means of email or phone (or otherwise) to obtain both qualitative and/or quantitative responses to regarding the differential experience and inform decisions about how to optimize a CE device. As is known, however, qualitative responses may be highly subjective and quantitative survey responses may be subject to some degree of response bias and other factors. Accordingly, for these reasons, these approaches may be used in conjunction with direct measurement to provide a more comprehensive and objective analysis FIG. 3 is a more detailed view of the consumer electronics device 130 of FIG. 1, according to one embodiment of the invention. As shown, the CE device 130 includes, without limitation, a central processing unit (CPU) 306, a graphics subsystem 308, an input/output (I/O) device interface 310, content storage 312, a network interface 314, an interconnect 320, and a memory 325.

The CPU 306 is configured to retrieve and execute programming instructions stored in the memory 325. Similarly, the CPU 306 is configured to store and retrieve application data residing in the memory 325. The interconnect 320 is configured to facilitate data transmission, such as programming instructions and application data, between the CPU 306, I/O devices interface 310, storage unit 312, network interface 314, and a memory 325. Like CPU 205, CPU 306 is included to be representative of a single CPU, multiple CPUs, a single CPU having multiple processing cores, and the like, as well as representative of control logic in the CE device 130 that do not function via a microprocessor. Memory 325 is generally included to be representative of a random access memory.

The graphics subsystem 308 is configured to generate frames of video data and transmit the frames of video data to display device 302. In one embodiment, the graphics subsystem 308 may be part of an integrated circuit along with the CPU 306. The display device 302 generally represents any technically feasible means for generating an image for display. For example, the display device 312 may be a liquid crystal display (LCD) display, CRT display, or DLP display. The display device 312 may be a TV that includes a broadcast or cable tuner for receiving digital or analog television signals. The input/output (I/O) device interface 310 is configured to receive input data from user I/O devices 304. Examples of user I/O devices 304 may include one of more buttons, a keyboard, and a mouse or other pointing device. The I/O device interface 310 may also include an audio output unit configured to generate an electrical audio output signal, and user I/O devices 304 may further includes a speaker configured to generate an acoustic output in response to the electrical audio output signal.

Content storage 312, such as a hard disk drive or flash memory storage drive, may store non-volatile data. The network interface 314 is configured to transmit data via the communications network 120, e.g., to stream media from the server system 105, as well as to receive a design variant 140 from the server and provide feedback regarding how a user interacts with or uses the design variant 140 assigned to the CE device 130 as part of a randomized controlled test.

As shown, the memory 325 stores programming instructions and data, including downloadable user interface components and/or parameters 335, downloadable control logic components and/or parameters 340, design variant monitoring component 345, and playback application 350. The downloadable user interface components and/or parameters 335 provide a particular set of user interface components and/or parameters associated with a design variant 140 assigned to the CE device 130. For example, as noted above, the CE device 130 may be configured to download a scripted user interface module (e.g., an Adobe Flash or BrightScript file) or to download parameters specifying to enable (or disable) certain user interface objects or functions of the content player 350. Similarly, the downloadable control logic components and/or parameters 340 provide a particular set of features, functionality or algorithms associated with a design variant 140 assigned to the CE device 130. For example, the downloadable control logic components and/or parameters 340 may provide a particular variant of an algorithm used to shuffle music files played by the playback application 350 or an algorithm used (or invoked on the server 105) to suggest choices of movies for a particular user.

Illustratively, playback application 350 includes a stored content playback component 352 and a streaming content playback component 354. The stored content playback component may be configured to play media files stored in storage 312. For example, the CE device 130 may be configured to store multiple video and/or music files synchronized with a home computer. Alternatively, the CE device 130 may be configured to playback media data stored on removable media, e.g., CD-roms, DVD-roms, or Blu-ray® discs. In contrast, the streaming content playback component 354 may be configured to play media content received (e.g., downloaded or streamed) over communications network 120 to the CE device 130.

In either case, the design variant monitoring component 345 may monitor user interaction with the playback application 350 (as configured via the downloadable user interface components and/or parameters 335 or the downloadable control logic components and/or parameters 340). For example, the monitoring component 345 may be configured to log events of events of interest on the CE device 130 in memory 325 (or storage 312), and periodically transmit the information to the RCT application 110. Alternatively, events and triggers of interest can be logged back to the servers as they occur. Of course, a combination of both may be appropriate. For example, as noted above, the CE device 130 may log hours of usage and update the server as each additional hour of usage occurs.

Figure 4:
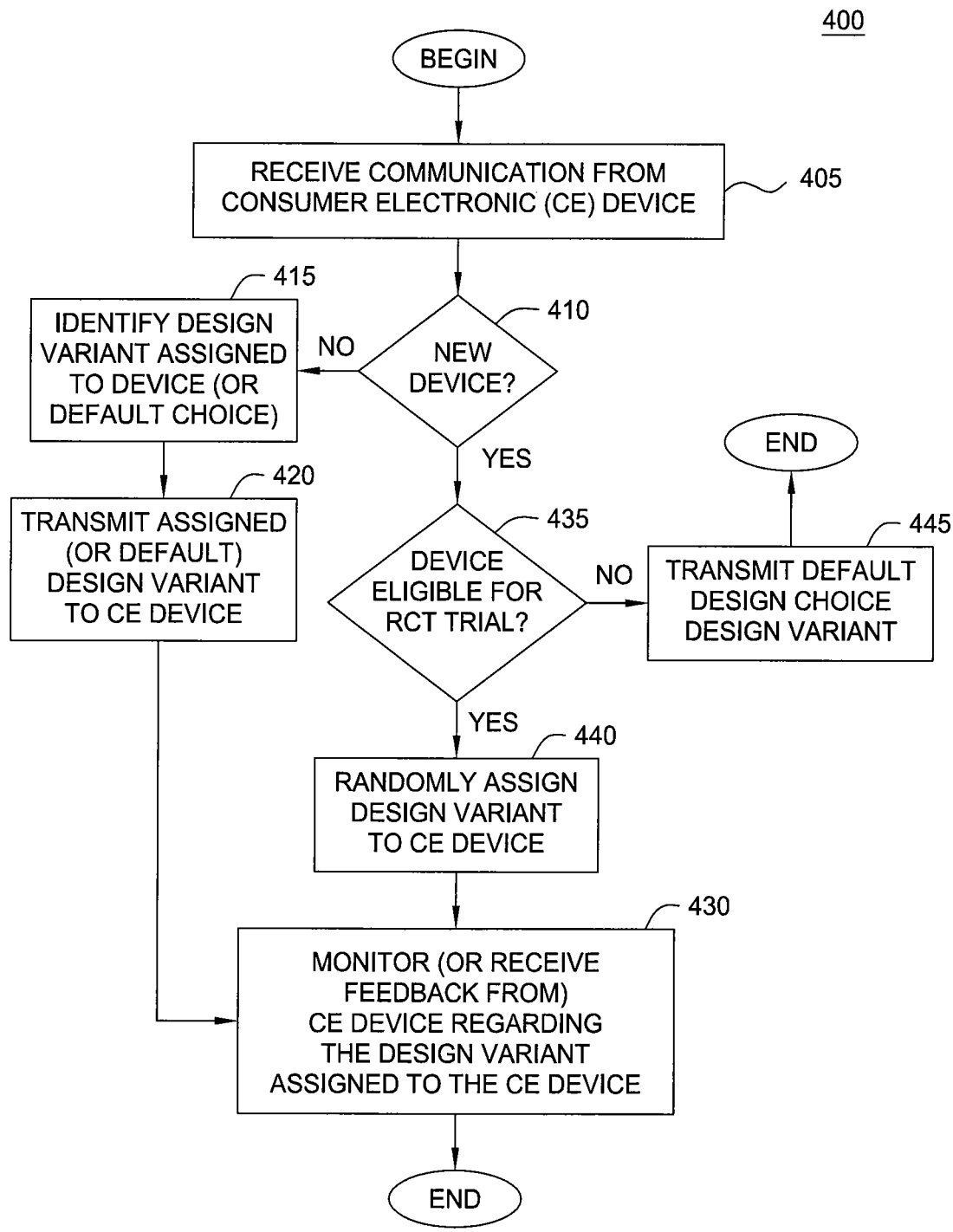
FIG. 4 illustrates a method for assigning consumer electronics devices to groups in a randomized controlled test, according to one embodiment of the invention.

FIG. 4 illustrates a method 400 for collecting feedback from a consumer electronics (CE) device participating in a randomized controlled test, according to one embodiment of the invention. As shown, the method 400 begins at step 405 where the content distribution application receives a communication from the CE device. As noted above, the CE device may be configured to communicate with a content distribution application on a server computer to request streaming media (or other downloadable) content. As part of the communication, the CE device may also interact with the RCT application to identify (or be assigned) a design variant for one or more aspects of a user interface presented on the CE device; to identify (or be assigned) a variant in an algorithm used to provide functionality on the CE device; or to report feedback regarding user interaction and the metric of interest that is the subject of the randomized controlled trial.

In one embodiment, the CE device 130 may participate in any number of randomized controlled testing trials. However, the data obtained from a particular user and CE device may be most beneficial when a user first begins interacting with the CE device (or when a major update is made available). That is, randomized controlled testing may in some cases be more sensitive when pools of users are "new" to the CE device or service, since they may not have prior expectations. Conversely, existing users may not notice or value features added after becoming familiar with how to use the CE device or service. Further, experimenting with existing users when removing features that they may have become familiar with may result in over-reactions to the change, rather than measured response to the value of the missing feature. As a result, CE devices are preferably assigned to one or more randomized controlled trials when a user initially begins using a given CE device. Accordingly, at step 410, the RCT application may determine whether the CE device associated with the request received at step 405 is a new device. As noted above, the CE device may provide an identifier such as a serial number. In such a case, the RCT application may store a table of serial numbers used to determine whether a given CE device has previously been assigned to participate in one or more randomized controlled testing trials being performed. For example, the communication may occur when a consumer first configures the CE device, establishes an account for a CE device or subscribes to a service available from a particular service provider (e.g., a provider of streaming media content).

If the CE device is "new," then at step 435, the RCT application may determine whether the CE device is eligible to participate in any randomized controlled testing trials currently being performed. A given randomized controlled trial may be used to evaluate incomplete implementations of new features, and as such, may be applicable only to particular subsets of users, e.g., only implemented in a particular geographic region, or only implemented for users connecting via a particular Internet service provider, or only implemented for users who have not elected to invoke parental controls on their device, etc. The RCT application may assign CE devices to test pools in order to create generally equivalent pools of users. Further, in one embodiment, the RCT application may continue to verify the eligibility of a given CE device to participate in a particular randomized controlled trial. For example, if a user enables an option that is incompatible with the metric of interest being tested, then the CE device may discontinue participation in a randomized controlled trial. Of course, in such a case, should users assigned to a default or control variant of a design choice enable the incompatible option, then that CE device would also discontinue participation in the randomized controlled trial.

If the CE device is not eligible to participate in the randomized controlled testing trial, then at step 445, the default design choice variant may be assigned and transmitted to the CE device. Otherwise, at step 440 the CE device may be randomly assigned one of the design variants (or the control variant) of the aspect of the CE device that is the subject of the randomized controlled trial. In one embodiment, the assignment may be made at the device level (e.g., using a serial number or other identifier associated with the CE device). Alternatively however, assignments may be made at other levels of granularity. For example, a CE device (or service accessed through the CE device) may support multiple user accounts, and in such a case, different design variants may be assigned to each distinct user account. Of course, the approach used may be tailored to suit the needs of a particular case. Preferably however, groups of users are assigned to different experiences, where the groups are large enough for statistically significant measurements to be made. A variety of well known statistical methods may be used to create the appropriate distribution pools (and pool sizes). At step 430, the RCT application may monitor (or receive feedback from) the CE device regarding the particular design variant assigned to that CE device (or user account).

Returning to step 410, if the CE device is not a "new" device, then at step 415, the RCT application may identify what design variant is assigned to the CE device. And at step 420, the assigned design variant (which may be the default design variant) may be transmitted to the CE device. Once transmitted, at step 430, the RCT application may monitor (or receive feedback from) the CE device as appropriate for the particular RCT test in which the CE device is participating.

As described, an experimenter might typically try several different variations of a design choice and randomly assign different experiences to different pools of CE devices users. At some point after a particular RCT trial begins, however, the experimenter might determine that one experience is a particularly poor or a particularly good design choice for the CE device. In such a case, the experimenter may use the derived knowledge to optimize the experience of users of the CE device. For example, in one embodiment, the RCT application may be configured to evaluate the feedback received from pools of CE devices, and when a particular design variant is identified as being particularly good or particularly bad, e.g., relative to predefined (e.g., user specified) thresholds, then CE devices in one pool may be reassigned to another—as appropriate. However, in one embodiment, a specified percentage of CE devices may be held back in order to further quantify the differences between one design variant and another.

Figure 5:
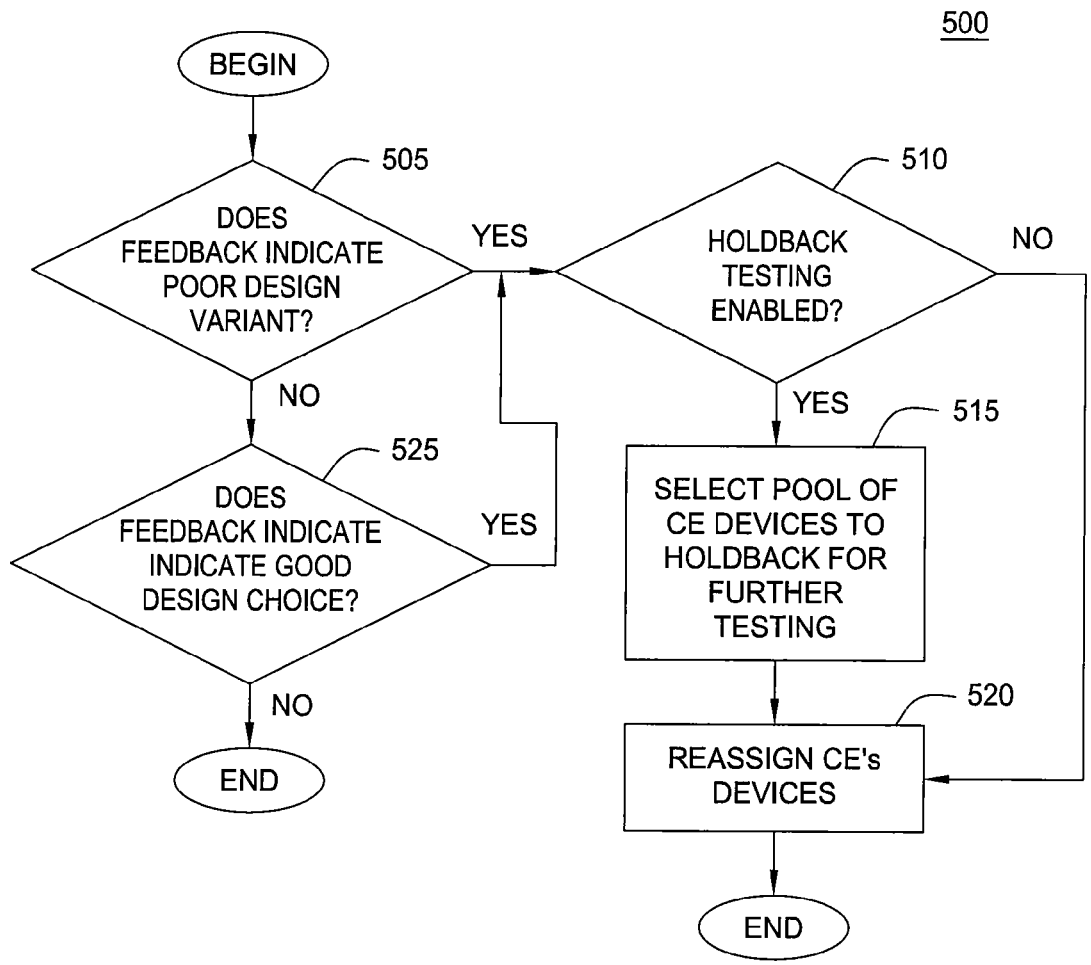
FIG. 5 illustrates a method for optimizing user experiences during a randomized controlled test, according to one embodiment of the invention.

For example, FIG. 5 illustrates a method 500 for optimizing user experiences during a randomized controlled trial, according to one embodiment of the invention. As shown, the method 500 begins at steps 505, where the RCT application determines whether the feedback obtained during an RCT trial indicates a poor design variant. For example, if a percentage of users that activate (or access) a feature being evaluated falls below a specified threshold, or if feedback indicates that the time required to perform a particular task exceeds a specified time, then that particular design variant may be discontinued from further testing. Similarly, at step 525, the RCT application may determine that the feedback obtained during an RCT trial indicates a particularly good design variant. For example, a feature being evaluated is accessed frequently or improves the time required for a user to perform a specified task.

At step, 510 if a particularly poor design choice has been identified (at step 505) or a particularly good design choice has been identified (at step 525), then at step 515 the RCT application may determine whether holdback testing is enabled for the design variant identified at one of step 505 and 525. Holdback testing refers to a process where an experimenter may quantify how much better (or worse) a given design variant is relative to a control variant (or against a prior design variant). That is, in some cases, initial feedback may indicate that that design variant is likely a to turn out to be particularly acceptable or unacceptable design choice, but the experimenter may desire to quantify how much better or worse (e.g. in total hours of usage) that design variant results in versus a control experience (e.g., a previous generation of a user interface). In such a case, at step 515 a control group of a statistically significant number of users is held back to the design variant identified at step 505 or 525. At step 520, a test pool of CE devices representing a comparable user composition is assigned to the new experience; and all others users (new and existing) receive a default experience that is set to match the likely best experience. For analysis, the comparable groups of users in the test and control pools can be compared with respect to the collected by the RCT application, while most users get the likely best experience.

In one embodiment, a poor experience might be discontinued by changing the binding of CE devices and users in the poor experience to a different design variant or a default experience. This might be a silent switch or include a notification to users via the CE device user interface, by email or by another channel.

In sum, techniques are disclosed for using randomized controlled testing (RCT) to evaluate a variety of different design choices for a CE device. In one embodiment, a CE device may be configured to connect to a server computer system managing a given RCT test. The server may assign the CE device to a test pool, where CE devices assigned to the same pool receive the same variant of the design choice. That is, network aware CE devices may connect to the server to obtain test-control parameters distributed in a randomized manner. One embodiment of the invention may be implemented as a program product stored on computer-readable storage media within the CE device 130. In this embodiment, the content player 110 comprising an embedded computer platform such as a set top box.

Advantageously, the RCT test may be designed to evaluate different variations of a user interface presented to users of the CE device, e.g., the structure or content of a control menu). The RCT test may also be designed to evaluate algorithms executed on the device (or the server), e.g., to test variations of an algorithm used for shuffling music selections on a portable music player or to test variations of an algorithm used for recommending movies to a user.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

I claim:

1. A computer-implemented method for evaluating a design choice for a consumer electronics (CE) device, the method comprising:
   receiving, from each of a plurality of CE devices, a communication over a data communication network;
   in response to the received communication from each respective CE device:
      determining an eligibility of each of the plurality of CE devices to participate in the dynamic randomized controlled testing,
      assigning one of a first design variant of the design choice and a second design variant of the design choice to the CE device, and
      transmitting an indication of the assigned design variant of the design choice to the CE device; and
   collecting feedback from the plurality of CE devices specifying one or more performance metrics associated with the design variant assigned to a respective CE device.

2. The computer-implemented method of claim 1, wherein the design variant provides a server-delivered user interface component transmitted to the CE device.

3. The computer-implemented method of claim 1, wherein the design variant provides one or more user interface parameters used to configure a user interface display generated by the CE device.

4. The computer-implemented method of claim 1, wherein the design variant provides executable logic used to provide one or more user features to a user of the CE device.

5. The computer-implemented method of claim 1, wherein the design variant provides one or more parameters used to select features to enable or disable on the CE device.

6. The computer-implemented method of claim 1, further comprising:
   in response to the feedback collected from the plurality of CE devices, determining that the performance metrics of the first design variant cross a specified threshold, reassigning CE devices, of the plurality assigned to receive the first design variant, to receive the second design variant.

7. The computer-implemented method of claim 1, wherein the CE device is a computing device configured to playback media data stored on a computer-readable storage medium.

8. The computer-implemented method of claim 1, wherein the design variant is randomly assigned to each of the plurality of the CE devices.

9. A computer-implemented method for evaluating a design choice for a consumer electronics (CE) device, the method comprising:
   providing a computing device configured to playback an audio-visual stream received over the data communications network;
   receiving, from each of a plurality of CE devices, a communication over a data communication network;
   in response to the received communication from each respective CE device:
      assigning one of a first design variant of the design choice and a second design variant of the design choice to the CE device, and
      transmitting an indication of the assigned design variant of the design choice to the CE device; and
   collecting feedback from the plurality of CE devices specifying one or more performance metrics associated with the design variant assigned to a respective CE device.

10. The computer-implemented method of claim 9, wherein the design variant provides executable logic used to provide one or more user features to a user of the CE device.

11. The computer-implemented method of claim 9, wherein the design variant provides one or more parameters used to select features to enable or disable on the CE device.

12. The computer-implemented method of claim 9, further comprising:
   in response to the feedback collected from the plurality of CE devices, determining that the performance metrics of the first design variant cross a specified threshold, reassigning CE devices, of the plurality assigned to receive the first design variant, to receive the second design variant.

13. A non-transitory computer-readable storage medium including instructions that, when executed by a processing unit, cause the processing unit to performing an operation for performing dynamic randomized controlled testing to evaluate design choices for a consumer electronics (CE) device, the operation comprising:
   receiving, from each of a plurality of CE devices, a communication over a data communication network;
   in response to the received communication from each respective CE device:
      determining an eligibility of each of the plurality of CE devices to participate in the dynamic randomized controlled testing,
      assigning one of a first design variant of the design choice and a second design variant of the design choice to the CE device, and
      transmitting an indication of the assigned design variant of the design choice to the CE device; and
   collecting feedback from the plurality of CE devices specifying one or more performance metrics associated with the design variant assigned to a respective CE device.

14. The computer-readable storage medium of claim 13, wherein the design variant comprises one of a server-delivered user interface component transmitted to the CE device and one or more user interface parameters used to configure a user interface display generated by the CE device.

15. The computer-readable storage medium of claim 13, wherein the design variant provides one of an executable logic used to provide one or more user features to a user of the CE device and one or more parameters used to select features to enable or disable on the CE device.

16. The computer-readable storage medium of claim 13, wherein the operation further comprises:

in response to the feedback collected from the plurality of CE devices, determining that the performance metrics of the first design variant cross a specified threshold, reassigning CE devices, of the plurality, assigned to receive the first design variant, to receive the second design variant.

17. The computer-readable storage medium of claim 13, wherein the CE device is a computing device configured to playback an audio-visual stream received over the data communications network.

18. The computer-readable storage medium of claim 13, wherein the design variant is randomly assigned to each of the plurality of the CE devices.

19. A system, comprising:

a memory that includes an application configured to performing dynamic randomized controlled testing to evaluate design choices for a consumer electronics (CE) device; and a processing unit coupled to the memory and configured to:
  receive, from each of a plurality of CE devices, a communication over a data communication network;
  in response to the received communication from each respective CE device:
    determining an eligibility of each of the plurality of CE devices to participate in the dynamic randomized controlled testing,
    assign one of a first design variant of the design choice and a second design variant of the design choice to the CE device, and
    transmit an indication of the assigned design variant of the design choice to the CE device; and
    collect feedback from the plurality of CE devices specifying one or more performance metrics associated with the design variant assigned to a respective CE device.

20. The system of claim 19, wherein the design variant comprises one of a server-delivered user interface component transmitted to the CE device and one or more user interface parameters used to configure a user interface display generated by the CE device.

21. The system of claim 19, wherein the design variant provides one of an executable logic used to provide one or more user features to a user of the CE device and one or more parameters used to select features to enable or disable on the CE device.

22. The system of claim 19, wherein the processing unit is further configured to:

in response to the feedback collected from the plurality of CE devices, determine that the performance metrics of the first design variant cross a specified threshold, reassigning CE devices, of the plurality, assigned to receive the first design variant, to receive the second design variant.

23. The system of claim 19, wherein the CE device provides one of a computing device configured to playback an audio-visual stream received over the data communications network.

24. The system of claim 19, wherein the design variant is randomly assigned to each of the plurality of the CE devices.

* * * * *